Feb. 15, 1944.  A. SCHÜTTE  2,341,664
CASING FOR GAS TURBINES
Filed Aug. 21, 1940
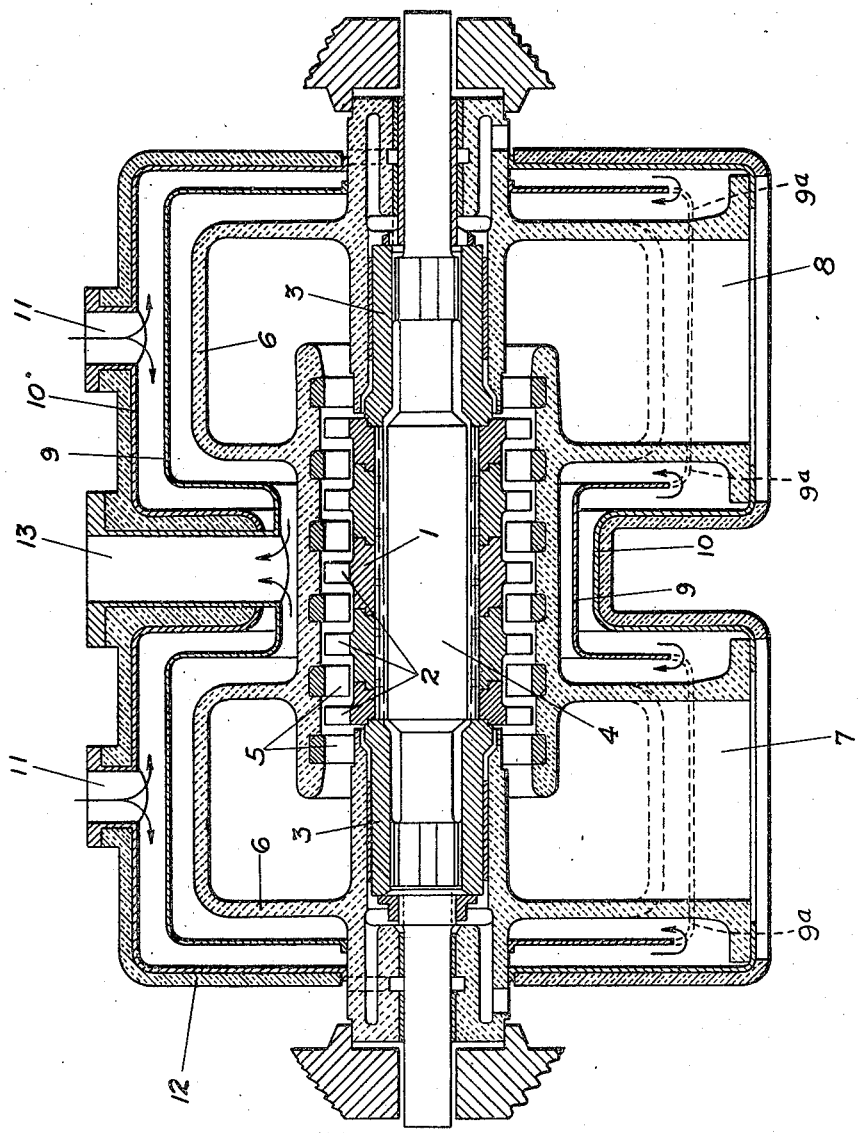
Inventor
Alfred Schütte
By Maréchal & Noë
Attorney Patented Feb. 15, 1944

2,341,664

UNITED STATES PATENT OFFICE 2,341,664

CASING FOR GAS TURBINES

Alfred Schütte, Augsburg, Germany; vested in the Alien Property Custodian

Application August 21, 1940, Serial No. 353,552
In Germany December 27, 1939

2 Claims. (Cl. 60—41)

This invention relates to a casing for gas turbines.

In order to operate a turbine of this class at maximum economy the actuating fluid must have a very high temperature. The part of a gas turbine subjected to greatest stresses is of course the rotor with the blades, but at high gas temperatures the casing, too, is exposed to considerable straining forces.

It is the object of the invention to provide a casing meeting all requirements by producing it from ceramic materials which possess remarkable strength even at high temperatures. The economically initial pressures of a gas turbine are as a rule quite low. They differ according to gas temperatures and partial efficiencies, but usually amount to approximately 3 to 4 atmospheres, so that in view of the resulting low stresses the casing may be made of ceramic materials without any reinforcement.

Such an arrangement is, however, open to other objections. As ceramic materials are sensitive to impact, turbine casings made therefrom can be easily damaged by action from without. Furthermore, the outside of the turbine casing, due to the high gas temperatures prevailing inside, will acquire a relatively high temperature, and the radiation of heat will therefore be considerable, unless the casing is carefully insulated.

In further accordance with the invention the ceramic turbine casing is therefore surrounded by two or more steel jackets, and the hollow spaces formed between the jackets and the casing are traversed, in particular order, by a portion of the air supplied by the compresser to the combustion chamber. A casing of this type is fully suited for economically operating turbines with gases of high temperature.

One form of the invention is illustrated by way of example in the accompanying drawing which shows a longitudinal section of a casing according to the invention.

A drum rotor 1 provided with moving blades 2 is supported by a shaft 4 by means of interposed tubes 3. Vanes or guide blades 5 are disposed in a casing 6 made of ceramic material. The actuating gas enters the turbine through a connection 7 and passes out through a connection 8. The casing 6 is surrounded at a certain distance by a protective jacket 9 of heat resistant steel which is enclosed by a second jacket 10 of structural steel.

The portion of compressed air intended for cooling the casing 6 is guided through air inlet ports 11 into the hollow space formed between the jacket 10 and jacket 9 and then enters the space between the jacket 9 and the casing 6. The outer air cooling passage communicates with the inner air cooling passage through ports 9a in the inner jacket 9 remote from the air intake ports 11 in the outer jacket 10. In this way, the coldest air will be found at the outer circumference of the turbine, heat radiation kept down, and only preheated air will flow past the casing 6. This arrangement prevents, moreover, excessive cooling of the casing 6 and the development of dangerous thermal stresses resulting therefrom. The outer steel jacket 10 acquires only a low external temperature, and a relatively slight and low-priced insulating layer 12 will therefore suffice for reducing heat losses to a minimum.

What is claimed is:

1. A casing for gas turbines arranged to enclose a rotor and comprising an inner casing of ceramic material having a reduced central portion carrying the fixed vanes with which the rotor cooperates, and having enlarged gas inlet and outlet portions at opposite ends of the central portion, an intermediate casing jacket surrounding and spaced from the ceramic casing, and an outer casing jacket surrounding and spaced from the intermediate casing, ports in the outer casing for admitting cooling air under pressure into the space between the outer and intermediate casing jackets and ports in the intermediate casing jacket remote from the said air admission ports for guiding said cooling air into the space between the intermediate casing jacket and said inner ceramic casing.

2. A casing for a gas turbine as recited in claim 1 wherein the ports for admitting cooling air into the space adjacent the ceramic casing are arranged adjacent both enlarged end portions of such ceramic casing while the outlet ports for such cooling air are arranged adjacent the reduced central portion of such ceramic casing.

ALFRED SCHÜTTE.